Feb. 7, 1933. J. W. BRYCE 1,896,284
PRINTING ATTACHMENT FOR SCALES
Filed May 5, 1930 2 Sheets-Sheet 1
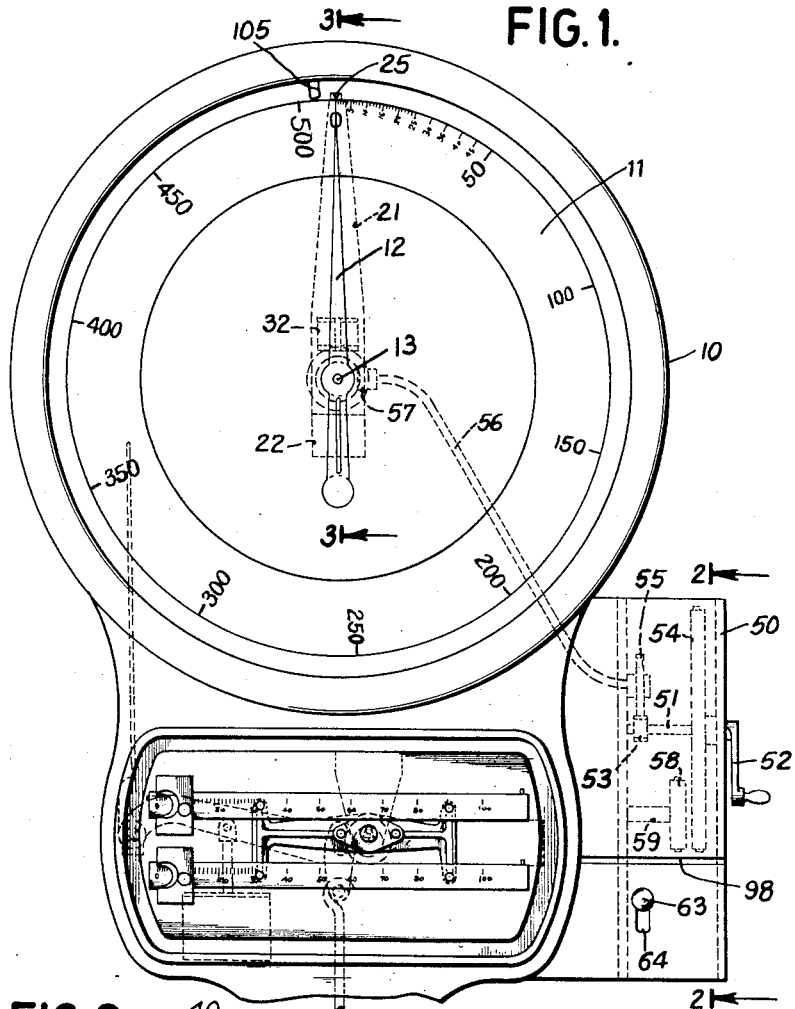
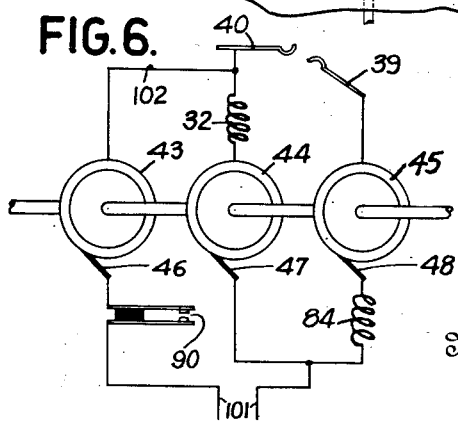
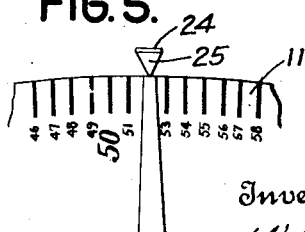
Inventor
J. W. Bryce
By his Attorney
W M Wilson Feb. 7, 1933.  J. W. BRYCE  1,896,284
PRINTING ATTACHMENT FOR SCALES
Filed May 5, 1930   2 Sheets-Sheet 2
FIG. 2.
FIG. 3.
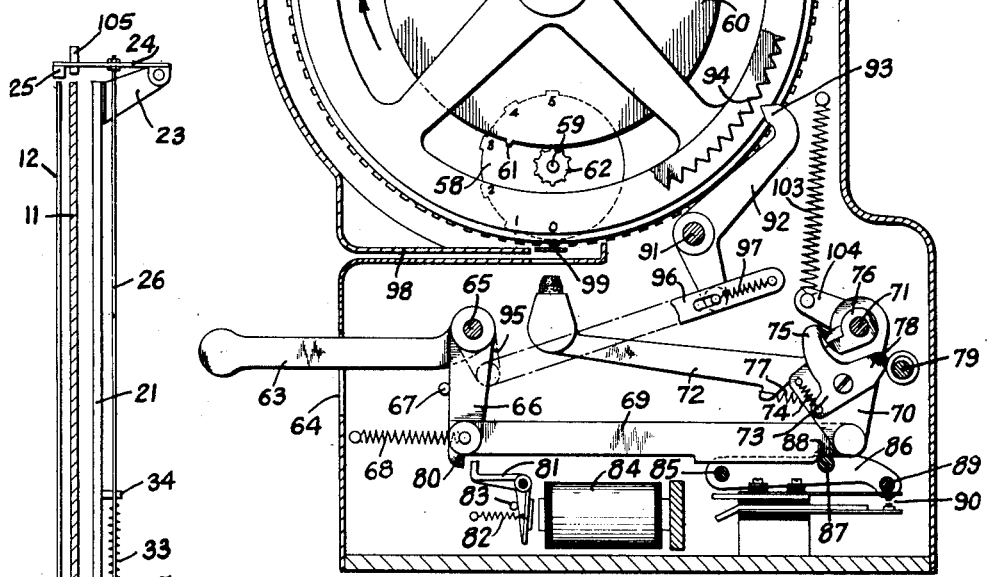
FIG. 4.
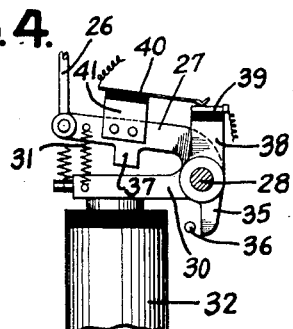
Inventor
J. W. Bryce
By his Attorney
Wm Wilson Patented Feb. 7, 1933

1,896,284

UNITED STATES PATENT OFFICE

JAMES W. BRYCE, OF BLOOMFIELD, NEW JERSEY, ASSIGNOR TO DAYTON SCALE COMPANY, OF DAYTON, OHIO, A CORPORATION OF NEW JERSEY

PRINTING ATTACHMENT FOR SCALES

Application filed May 5, 1930. Serial No. 450,041.

This invention relates to weighing scales in general and particularly to scales provided with printing attachments for recording the weight on a suitable record medium such as a card, sales slip or record strip.

The primary object of the present invention is to provide an improved recording mechanism for a weighing scale in which the type wheels for recording the weight on the record medium are not directly set by the weighing operation, thereby relieving the scale of the added and objectionable friction which results when the type wheels are directly controlled by the weighing mechanism.

A further object is to provide an interlocking mechanism which compels the operator to set the type wheels properly and correctly before it is possible to record the weight on the record medium thereby insuring that a correct record will be made.

Other objects and advantages of the present invention will become apparent from a study of the following specification and claims and of the accompanying drawings which illustrate what is at present considered a preferred embodiment of the invention.

In the drawings:

Fig. 1 is a vertical elevation of a weighing scale of the dial type, illustrating the manner of attachment of the printing mechanism embodying the present invention.

Fig. 2 is a vertical sectional view of the printing mechanism taken on the line 2—2 of Fig. 1.

Fig. 3 is a vertical section of the dial and finder, taken on the line 3—3 of Fig. 1.

Fig. 4 is a detail view of the finder relay, the armature being shown in attracted position.

Fig. 5 is a detail view of a portion of the dial, illustrating the relation between the pointer and the finder when the finder is properly adjusted.

Fig. 6 is a circuit diagram illustrating the electrical connections of the locking magnet and relay.

The numeral 10 (Fig. 1) represents generally a dial type weighing scale having the usual dial 11 and movable pointer 12. The scale 10, for purposes of illustration only, is shown with its dial 11 graduated up to 500 pounds. The weighing mechanism forms no part of the present invention therefore no details of construction will be given herein except as may be incidental to an understanding of the invention.

The pointer 12 is fixed to a shaft 13, journalled in suitable anti-friction bearings 14 and carries fast thereto a pinion 15 which meshes with a rack, not shown, transmitting the motion from the weighing mechanism to the pointer 12. The anti-friction bearings 14 are carried by frame members 16 and 17, the frame member 16 being provided with a cylindrical extension 18 concentric with the shaft 13 and supporting one of the bearings 14. Journalled upon the extension 18 is a pinion sleeve 19 having the pinion 20 integral therewith. An arm 21, provided with a counterweight 22 is fastened to the left end of the sleeve 19 (Fig. 3) and is provided at its upper end with an arm 23 extending upwardly and to the right in that figure.

The arm 21 is adapted to be used as a finder in a manner to be described more fully herein after and is provided with a member 24 pivoted to the end of arm 23 and having an index portion 25 which may be brought into coincidence with the free end of the pointer 12. The member 24 is of sufficient length to extend over the end of pointer 12 and, by means of a rod 26, is pivotally connected to an arm 27 journalled upon a short rod 28 carried by a frame 29 which is mounted upon the finder 21. A second arm 30 (Figs. 3 and 4) is also journalled upon the rod 28 and is connected by a spring 31 with the arm 27, the spring tending to draw the two arms together. The arm 30 is adapted to be rocked slightly in a counterclockwise direction by a relay magnet 32 carried by the frame 29. A spring 33, interposed between the end of arm 30 and a pin 34 carried by the finder 21, normally holds the arm 30 in the position shown in Fig. 3 with a tail piece 35 of arm 30 against a fixed pin 36 carried by the frame 29. An abutment 37 formed as part of arm 27 holds the two arms 27, 30 in spaced relation to each other as shown in Fig. 3.

Mounted upon an extension 38 of arm 30 is an insulated contact 39 adapted to cooperate with a contact 40 carried by and insulated from a supporting piece 41 rigidly mounted upon arm 27. The contacts 39, 40 are normally open and the magnet 32 deenergized, the normal position of the parts being shown in Fig. 3. Mounted upon the sleeve 19 is an insulating tube 42 carrying three contact rings 43, 44, 45 cooperating with brushes 46, 47, 48 carried by a support 49 mounted upon the frame member 16. The contact 40 is connected to the ring 43 and also to one end of the winding of magnet 32 (Fig. 6) the other end of the winding being connected to the second ring 44. The contact 39 is connected to the third ring 45.

The magnet 32 may be termed the finder relay since its function is to determine if the finder 21 has been positioned properly to bring the index 25 over the end of the pointer. The operation of the finder relay will be explained later herein in connection with the operation of the printing mechanism as a whole.

The printing mechanism is contained within a casing 50 (Figs. 1 and 2) which is shaped to the contour of the main scale casing 10. A shaft 51 has fixed thereto a crank 52 outside the casing 50 and also has fixed thereon a pinion 53 and a type wheel 54. The pinion 53 meshes with a larger gear 55 adapted to drive a flexible shaft 56 which in turn drives a bevel pinion 57 meshing with the bevel pinion 20. It will be clear that the finder 21 may be moved to any desired point on the dial 11 by turning the handle of crank 52. The ratio of the gearing is such that one revolution of crank 52 will move the finder 21 over a range of 100 pounds on the scale dial.

The type wheel 54 is provided with one hundred type characters reading from "00" pounds to "99" pounds to correspond with each division on the scale dial 11 over a range of 100 pounds. A second type wheel 58, adjacent to the type wheel 54 is carried by a short shaft 59 supported by the printer frame and is provided with type characters from 1 to 5 representing hundreds of pounds. Normally the type wheel 58 is positioned so a blank space is presented at the printing line when the index 25 of finder 21 coincides with the zero on the scale dial in order to avoid printing a cipher when the article weighed is less than 100 pounds.

It will be apparent that only half of the circumference of type wheel 58 need be provided with type characters. A transfer disc 60 is fast to type wheel 54 and is provided with a single tooth 61 adapted to engage the teeth of a pinion 62 integral with type wheel 58. It will be clear that a complete revolution of type wheel 54 in either direction will bring the tooth 61 into engagement with the teeth of pinion 62 and turn the type wheel 58 one tooth. Thus, if the finder 21 is to be turned from zero position to bring the index 25 into coincidence with the pointer 12 indicating 415 pounds, for example, the type wheel 54 will need to be revolved four and a fraction times by means of crank 52 until the finder index 25 lies directly over the end of the pointer 12 and at each revolution of type wheel 54 the type wheel 58 will be advanced one tooth or four teeth in all. The foregoing operation will bring the "4" type character on type wheel 58 and the "15" type character in type wheel 54 to the printing line so that "415" will be printed. If the finder 21 is now returned to the zero point on scale 11 the pinion 62 will be reversely turned one tooth for each of the four complete revolutions and slightly more of handle 52 required to bring the finder 21 back to its original position in consequence of which the type wheels 58 and 54 will both present their zero positions at the printing line.

The operating handle 63 projects through a slot 64 in the casing 50 and is fixed to a shaft 65 journalled in the frame supporting the printing mechanism. An arm 66 is secured to the shaft 65 and is normally held against a fixed pin 67 by means of a spring 68. A link 69 is pivotally connected to the end of arm 66 and also to a member 70 journalled upon a shaft 71 carrying a printing hammer 72. A three armed latch member 73 is normally held by a spring 74 with the hooked portion 75 overlying and in engagement with an arm 76 secured to shaft 71. The hammer 72 is pivotally mounted upon an arm fast to the shaft 71, and is resiliently held against a stop pin carried by the said arm by means of a spring 77. The tail 78 of the latch 73 is adapted to cooperate with a trip stud 79 having an eccentric portion which may be adjusted by turning the stud 79 so as to adjust the point at which tripping of the latch 73 occurs.

The printing hammer and its operating connections are of the well-known type shown in Letters Patent No. 1,075,627 and No. 1,348,218 as well as in numerous other patents, therefore it is unnecessary to go into further detail herein regarding their specific construction.

The arm 66 is provided with a projection 80 adapted to cooperate with one arm of a locking member 81 held by a spring 82 against a fixed stop 83. An armature carried by the other arm of lever 81 is adapted to be attracted by a locking magnet 84 carried by the frame of the printing mechanism. Pivoted at 85 to the frame is an arm 86 having a stud 87 cooperating with a cam surface 88 formed in the link 69. An insulated stud 89 on the end of arm 86 normally rests on the free end of one of a pair of insulated spring contact members 90 carried by the printer frame. The normal relationship of the parts is shown in Fig. 2 with contact members 90 separated. It will be seen, therefore, that the handle 63 is normally locked except for the slight degree of movement sufficient to close contacts 90.

Pivoted at 91 is a type aligning member 92 having a tooth 93 adapted to engage interdental spaces 94 formed in the type wheel 54 and corresponding with the type characters. An arm 95 fast upon shaft 65 is connected by means of a link 96 and a pin and slot connection with the member 92, a spring 97 normally holding the pin in the right end of the slot (Fig. 2).

The casing 50 of the printing mechanism is formed with an opening 98 into which may be slipped a suitable card or other record medium such as a bill or sales slip previous to operating the handle 63 to print. A suitable inking ribbon 99 is provided and may be operated in any desired manner. Since the ribbon mechanism can be of any desired type no details will be given herein as it does not constitute a part of the invention.

The specific details of construction having been described the operation of the improved printing mechanism will now be described in detail.

It will be assumed that an article has been placed on the platform of the scale and found by the reading on the dial to weigh 467 pounds. It is desired to record the weight on a sales or delivery slip. The slip is slid into the opening 98 and the crank 52 turned until the index 25 of finder 21 coincides exactly with the end of the pointer 12. Assuming that the finder 21 was at the home position with the index 25 at the zero position on the scale dial, it will be necessary to turn the handle 52 four complete revolutions and 67/100 of a revolution until the index 25 is coincident with the pointer 12. The four complete revolutions of the type wheel 54 will cause the tooth 61 to advance the type wheel 1/10 of a revolution with each complete revolution of type wheel 54 so that the type wheel 58 will present a "4" at the printing line while the further 67/100 of a revolution of type wheel 54 will bring the "67" type character to the printing line. The printing mechanism is now in readiness for printing which is accomplished by a depression of handle 63.

The handle 63 rocks the shaft 65 thereby moving the link 69 to the right (Fig. 2) closing contacts 90. Closing of contacts 90 establishes a circuit (Fig. 6) from the left side of the line 101 supplying electric current, through brush 46, contact ring 43, line 102, relay 32, contact ring 44, brush 47, to the right side of line 101. Energization of relay 32 causes it to attract its armature thereby rocking arm 30 counterclockwise (Fig. 3) to the position shown in Fig. 4 closing contacts 39, 40 and establishing a second circuit from left side of line 101, brush 46, contact ring 43, contacts 39, 40, now closed, contact ring 45, brush 48, locking magnet 84 to the right side of line 101.

The energization of locking magnet 84 causes it to attract its armature thereby rocking the locking member 81 out of the path of the stop 80 and permitting the link 69 to move further to the right (Fig. 2). The continued movement of the link 69 to the right results in the shaft 71 being rocked counterclockwise drawing down the hammer 72. Near the end of the downward stroke of the handle 63 the tail 78 of latch 73 will engage the eccentric portion of stud 79 and will be rocked slightly counterclockwise a sufficient distance to disengage the hook 75 from the hammer 72 and permit a spring 103 interposed between a fixed stud and an arm 104 fast on shaft 71 to propel the hammer 72 against the type so as to strike a percussive blow. A suitable pin, not shown, stops the arm carrying the hammer before the hammer actually drives the record card and inking ribbon against the type, the resilient connection 77 permitting the momentum imparted to the hammer to perform the actual printing upon the record card.

As the handle 63 is moved downwardly the arm 95 is rocked counterclockwise and causes the tooth 93 to enter one of the spaces 94, the slack in the pin and slot connection of link 96 to the aligning member 92 being eventually taken up, thereby holding the type wheel 54 steady when the hammer 72 strikes. The spring 68 restores the arm 66 and link 69 to their normal position with the arm 66 against the stop pin 67 as soon as the handle 63 is released. As a consequence of the foregoing operations "467" will be printed on the record card or slip.

The foregoing sequence of operations presumes that the finder 21 has been properly positioned with the index 25 coincident with the end of the pointer. If it should happen that the finder is carelessly set and the index 25 is not in coincidence with the pointer 12 the printing handle 63 will be locked by the locking member 81 against a complete depression. This result is obtained in the following manner: When the contacts 90 are closed by the slight depression of the handle 63 the relay 32 will be energized and attract its armature thereby moving the contact 39 in the direction of contact 40. If the pointer 12 and index 25 coincide the member 24 will be prevented from rocking downwardly under the influence of the tension applied to spring 31 by the rocking of arm 30 by magnet 32, owing to the end of the pointer 12 obstructing the free end of member 24, and as a consequence the contact 40 will remain stationary. The contact 39, therefore, will come into contact with the contact 40 thereby closing the circuit to magnet 84 and unlocking the printing mechanism.

If the index 25 is not coincident with the end of pointer 12, the energization of magnet 32 will pull down both arms 27 and 30 simultaneously and equally since the end of the pointer 12 no longer obstructs the free end of member 24 provided with the index 25, as a consequence the original or normal distance between the contacts 39, 40 will be preserved and they will not come into contact with each other to close the circuit to magnet 84. The whole result will be that the projection 80 will strike the locking member 81 and prevent printing upon the record card or slip.

It will be clearly seen from the foregoing description that the closing of contacts 90 establishes a test circuit to determine if the finder has been properly positioned to print the correct weight and compels the operator to use care in setting the finder. It also ensures that a fradulent record slip will not be printed by a dishonest employee.

It will be noted that the 500 pound graduation on the scale dial 11 does not coincide with the zero point so that it is necessary to provide a stop 105 to prevent the finder 21 from being returned to the home position except by turning it counterclockwise about the scale dial. It is not necessary to return the finder to the home position after each weighing operation since the transfer tooth 61 is equally effective regardless of the direction in which the type wheel 54 is turned.

Various modifications may be made in the construction described herein in order to adapt the invention to suit varying requirements met with in actual practice, therefore, it is not desired to limit the invention to the precise construction shown and described.

I claim:

1. In a recording scale, the combination with the scale pointer of a manually settable member positionable to coincide with said pointer, a printing mechanism, operating means for said printing mechanism and interlocking means for preventing operation of said operating means except when said manually settable member is coincident with said pointer.

2. In a recording scale, the combination of means for indicating weight, a member adapted to be brought to coincide with said weight indicating means, type wheels controlled by said member, means for printing upon a record medium, operating means therefor, means for normally locking said operating means, and means for releasing said locking means when said member is coincident with said weight indicating means.

3. In a recording scale, the combination of means for indicating weight, type wheels, means for positioning said type wheels, normally locked means for printing from said type wheels, and means for compelling the proper positioning of said type wheels to correspond with the weight indicated before printing can be effected from the type wheels.

4. In a recording scale, the combination of manually settable type wheels, means for printing from said type wheels, operating means for said printing means, said operating means being normally locked against all but a slight preliminary movement, and means controlled by said preliminary movement to determine the correctness of the setting of said type wheels, said last named means unlocking said operating means when said type wheels have been correctly set to permit printing from said type wheels.

5. In a recording scale, the combination of means for indicating weight, type wheels for printing the weight indicated, means for positioning said type wheels to the weight indicated including a manually settable member adapted to cooperate with said weight indicating means, means for printing from said type wheels, means for operating said printing means normally locked against all but a slight preliminary movement, means for locking said operating means and means carried by said manually settable member controlled by said preliminary movement for controlling said locking means and rendered effective to unlock said locking means when said type wheels correspond at the printing line to the weight indicated.

6. In a recording scale, the combination of means for indicating weight, means for printing the weight indicated upon a record medium, means cooperating with said indicating means and said printing means for setting said printing means, means for operating said printing means to effect printing on said record medium, and means for compelling a correct adjustment of said setting means before printing upon said record medium can be effected by said operating mechanism.

7. In a recording scale, the combination of mechanism displaceable according to a weighing load, printing means with means for positioning the same according to the displacement of said mechanism, operating means for the printing means and means for preventing the operation of the operating means whenever the position of the printing means does not coincide with the displacement of said mechanism.

8. In a recording scale, weight responsive means displaceable according to the magnitude of the load, recording means settable according to a displacement of the weight responsive means and operable to print records proportional to displacements of the weight responsive means and interlocking mechanism controlled by the weight responsive means for preventing an operation of the recording mechanism until the latter has been set in accordance with a displacement of the weight responsive means.

9. A scale having an element displaceable in proportion to the load, recording mechanism settable in accordance with a displacement of said element and operable to record the value of said displacement, means for preventing an operation of the recording mechanism until the latter has been set in accordance with a displacement of said element, a member controlled by the recording mechanism and having a definite co-operative relationship with said element when the recording mechanism has been set in accordance with the displacement of said element, and means controlled by said element for disabling the preventing means when said member is in co-operative relationship with said element.

10. In a recording scale, recording mechanism settable to record values proportional to the weight of the load, a normally ineffective operating device for said mechanism and releasable to effect a recording operation when the recording mechanism has been set to record a value proportional to the load, and means for releasing the operating device for a recording operation when the recording mechanism has been set to record a value proportional to the load including an element actuated by the load and proportional to the latter for controlling the releasing means to release the operating mechanism.

11. In a recording scale, a load responsive member displaceable in proportion to the load, an element co-operating with the load responsive member and settable to coincide therewith, recording mechanism having recording devices controlled by said element, means for preventing the making of a record from said devices, and connections carried by said element for disabling the preventing means when said element has been set to coincide with the load responsive member.

12. The invention set forth in claim 11 in which the preventing means comprises an electrically operated locking device controlled by the load responsive member.

13. A recording scale having a member displaceable proportionately to the load, recording devices and means for making a record with said devices, a lock for the last named means, means connected to the recording devices for positioning the latter in accordance with a displacement of the first named member and including a member positionable in alignment with the first named member, and an electrical control device for operating said lock when both members are in alignment.

14. In a load measuring instrument wherein a measuring chart is provided; an element movable relative to the chart, means for moving the element to a position determined by the load, an auxiliary device, means for preventing the auxiliary device from performing its function, and means controlled by aforesaid element for releasing said preventing means to render said device effective to function when said element reaches aforesaid position.

15. In a scale wherein weighing mechanism is provided; recording means, means for setting the recording means to record different values, a device for effecting recording by the recording means, means for restraining operation of said device, and means controlled by the weighing mechanism for releasing said restraining means to render the device effective to function.

16. A scale having a member displaceable proportionately to a load and an auxiliary device operable proportionately to displacement of said member, said auxiliary device including means for operating said device, a lock therefor, means for setting the auxiliary device proportionately to a displacement of said member including a member positionable in alignment with the first named member, an electrical circuit for controlling said lock, and a sensing device carried by one of said members for sensing the alignment of the latter and rendering said circuit effective to control said lock.

17. A scale having a load responsive member, and auxiliary mechanism operable according to the response of said member to the load including operating mechanism therefor and means for rendering the latter ineffective, means for positioning the auxiliary mechanism in accordance with the response of said member to the load including a member settable in alignment with the first named member, an electrical circuit for controlling the first named means to render the operating mechanism effective, and a device carried by one of said members and adapted to sense the alignment of said members and control said circuit.

18. In a combination including weighing mechanism displaceable under the influence of a load; recording mechanism settable correspondingly to the load while the weighing mechanism is constantly under the control and influence of the load, means for causing the recording mechanism to make a record on a record sheet according to the setting of said recording mechanism, and means for preventing the recording operation unless at the time the setting of the recording mechanism corresponds to the load.

In testimony whereof I hereto affix my signature.

JAMES W. BRYCE.